Figure 1:
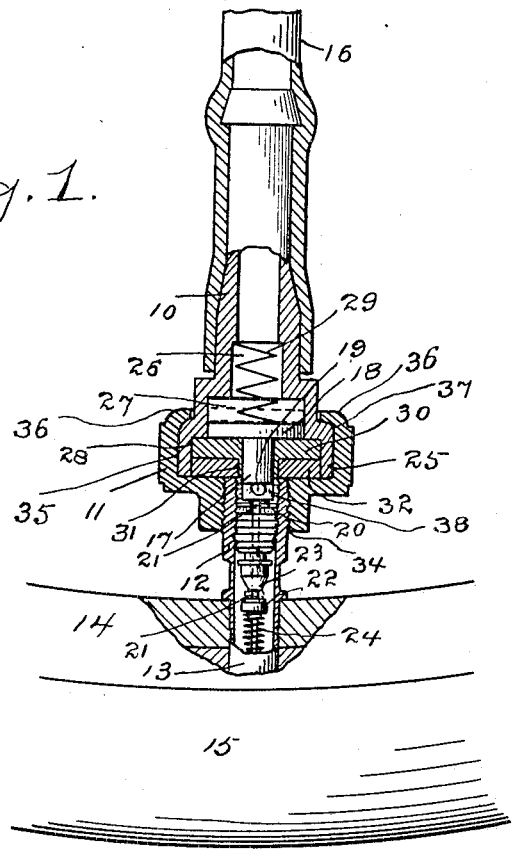

No. 838,219. PATENTED DEC. 11, 1906.
W. S. STAPLEY.
NIPPLE CONNECTION AND VALVE OPENER.
APPLICATION FILED APR. 13, 1906.

WITNESSES
H. A. Lamb
S. W. Atherton

INVENTOR
William S. Stapley
BY
A. M. Wooster
ATTORNEY

UNITED STATES PATENT OFFICE.

WILLIAM S. STAPLEY, OF BRIDGEPORT, CONNECTICUT, ASSIGNOR TO THE BRIDGEPORT BRASS COMPANY, OF BRIDGEPORT, CONNECTICUT, A CORPORATION OF CONNECTICUT.

NIPPLE CONNECTION AND VALVE-OPENER.

No. 838,219. Specification of Letters Patent. Patented Dec. 11, 1906.

Application filed April 13, 1906. Serial No. 311,487.

*To all whom it may concern:*

Be it known that I, WILLIAM S. STAPLEY, a citizen of the United States, residing at Bridgeport, county of Fairfield, State of Connecticut, have invented a new and useful Nipple Connection and Valve-Opener, of which the following is a specification.

This invention is adapted for use in all tire connections where it is required to inflate tires by means of a pump, and is especially adapted for use in connection with pumps using a pressure-gage; and the invention has for its object to provide a nipple connection and valve-opener that will open the tire-valve the instant pump-pressure is applied, will permit the tire-valve to remain open after the pump-pressure is relieved, thus permitting the pressure-gage on the pump to indicate correctly the air-pressure in the tire, and will permit the tire-valve to be closed by means of the air-pressure in the tire the instant the connecting-sleeve is turned backward sufficiently to permit a very slight escape of air, the tire-valve closing so quickly, moreover, as not to perceptibly affect the air-pressure therein, as indicated by the pressure-gage on the pump. It is of course well understood that tire-valves frequently become set in use and will not open when air-pressure is applied, thus causing loss of time in removing the connection and forcing the valve open, which is sometimes not easy in the absence of a special tool. Moreover, after inflation the instant the pump-pressure is relieved the tire-valve closes, the result being that the pressure-gage on the pump does not accurately indicate the actual air-pressure in the tire. Valve-openers heretofore used in nipple connections have partially overcome these objections. So far as I am aware, however, they have been positive in their action and have held the tire-valve open until the connection was removed from the nipple. The result has been such a serious loss of air as to materially reduce the tire-pressure from that indicated by the pressure-gage on the pump.

My present invention enables me to wholly overcome the objections stated and provide a valve-opener for nipple connections that will permit the tire-valve to be closed by the air-pressure in the tire the instant the sleeve of the connection is turned backward sufficiently to permit a slight escape of air and before sufficient air has escaped to effect a perceptible reduction in the pressure.

With these and other objects in view I have devised the novel nipple connection and valve-opener which I will now describe, referring to the accompanying drawings, forming a part of this specification, and using reference characters to indicate the several parts.

Figure 2:
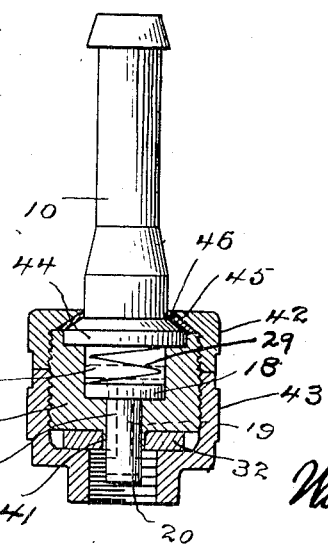
Figure 3:
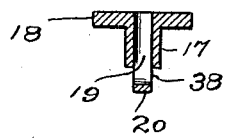
Figure 4:
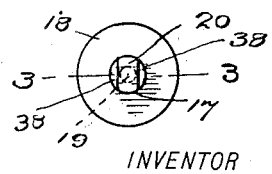

Figure 1 is a longitudinal section of one form of my novel valve-opener and a tire-nipple connected as in use, the tire-valve and the plunger and spring of my novel connection being shown in elevation; Fig. 2, a view on an enlarged scale, partly in longitudinal section and partly in elevation, illustrating a variant form of the invention; Fig. 3, a section of the plunger detached on the line 3 3 in Fig. 4, and Fig. 4 is an inverted plan view of the plunger detached.

10 denotes the shank of a nipple connection; 11, the connecting-sleeve; 12, the nipple; 13, the tire-valve as a whole; 14, the rim of a wheel; 15, the tire, and 16 the flexible tube which connects the pump (not shown) with the shank of the connection.

The essential feature of the invention is a plunger 17, having an enlarged head 18. This plunger has an opening 19 through it for the passage of air. The lower end of the opening branches, leaving a face 20 at the lower end of the plunger which engages the rod 21 of a tire-valve. In Figs. 1, 3, and 4 I have shown the lower end of the plunger as cut away on opposite sides of face 20, as at 38, to insure free passage of air. The special construction of the tire-valve is unimportant so far as the present invention is concerned. All tire-valves of this general type are provided with a rod 21, which extends upward to or slightly above or below the top of the nipple, and the valve proper, which is carried by the rod and indicated by 22, is normally held in engagement with the seat (indicated by 23) by means of a spring 24.

In the form illustrated in Fig. 1 the lower end of the shank is provided with a head 25, which is formed integral with the shank and is provided with successively-larger recesses, (indicated, respectively, by 26, 27, and 28.) The head of the plunger lies in recess 27, in which it moves freely, and may be held forward in said recess by means of a spring 29, which is socketed in recess 26, the ends of the spring bearing against the base of recess 26 and against the head of the plunger. This spring is not an essential feature of the construction, as the plunger will normally operate perfectly without it. The spring is preferably provided, however, to insure the retention of the plunger in its forward position under all conditions, even when the connection is inverted, as will be more fully explained. Spring 29 is made very much lighter than the valve-spring, in practice about one-fourth the strength of the valve-spring, so as to insure that when pressure upon the head of the plunger is relieved the spring of the tire-valve will lift the plunger against the power of spring 29 and return the valve to its normal or closing position.

Lying in recess 28 is a metallic disk 30, having extending concentrically therefrom a sleeve 31. 32 denotes a packing-washer lying under the disk and having a central opening through which the sleeve passes. The plunger passes freely through the disk and the sleeve, the latter acting to prevent the packing-washer from being compressed against the plunger. The connecting-sleeve 11 is swiveled on the head and is provided at its lower end with an internal thread 34, which is adapted to engage the external thread of the nipple, as clearly shown in Fig. 1. The connecting-sleeve is provided with an internal recess 35, which receives the lower end of head 25, and is rotatably secured in place by means of a flange 36, which is closed over a shoulder 37 on the head, as clearly shown in Fig. 1.

In the form illustrated in Fig. 2 the head of the plunger and the spring are socketed in a recess 39 in a block 40, the plunger itself passing freely through the lower portion of the block. The block is provided with a sleeve 41, which passes through a packing-washer 32, as in the other form. Block 40 is externally threaded and is engaged by the members of a two-part connecting-sleeve, (indicated, respectively, by 42 and 43.) The two parts of the connecting-sleeve are turned onto the block from opposite directions, and block and sleeve rotate together in use. At the lower end of shank 10 is a head 44, which rests upon the block, is beveled upon its upper face, and lies within a correspondingly-beveled flange 45 on part 42 of the connecting-sleeve, a packing-washer 46 being interposed between the head and the flange, as clearly shown, in order to make a perfectly air-tight joint when the connecting-sleeve is screwed down upon a nipple.

The operation is as follows: In making the connection the connecting-sleeve is screwed down tight upon the nipple, as indicated in Fig. 1, the upper end of the nipple engaging packing-washer 32 and making a perfectly air-tight joint. As the valve-spring is stronger than spring 29, it follows that when the connecting-sleeve is screwed down to place and the upper end of the valve-rod engages faces 20 upon the plunger the latter will be lifted against the power of spring 29, a raised position of the head of the plunger being indicated by dotted lines in Figs. 1 and 2. The instant pump-pressure is applied, however, owing to the relatively large area of the head of the plunger, the plunger will be forced forward to its normal position, as shown in full lines, will compress the valve-spring, and force the tire-valve away from its seat, as shown in Fig. 1, so that air from the pump will pass freely through the plunger and the valve into the tire. As the air-pressure upon opposite sides of the head of the plunger is balanced, the plunger will remain in the open position after the operation of the pump has been stopped, and a pressure-gage on the pump will register with perfect accuracy the air-pressure in the tire. The instant, however, that the connecting-sleeve is turned backward in disconnecting it from the nipple there will be a slight escape of air, which will overcome the balance of pressure and permit the valve-spring to instantly close the valve in the tire and prevent appreciable escape of air therefrom, this closing of the tire-valve being effected so quickly that there is hardly a perceptible reduction of the air-pressure in the tire, so that by the use of my novel connection the operator is enabled to retain in the tire the actual air-pressure indicated by the pressure-gage upon the pump. It should be noted that spring 29 is only provided to hold the plunger at its normal or forward position under all circumstances, even should the connection be inverted. The pump-pressure acting on the relatively large area of the head of the plunger easily overcomes the power of the valve-spring and forces the valve to the open position, even should it become set. As soon, however, as there is a slight relief of the pump-pressure upon the head of the plunger through escape of air when the connecting-sleeve is turned backward, thereby destroying the balance of pressure, the tire-spring will close the tire-valve and lift the plunger against the power of spring 29.

Having thus described my invention, I claim—

1. A nipple connection and valve-opener comprising a shank, a connecting-sleeve swiveled thereon, and a plunger having an enlarged head, an air-opening and a face adapted to engage the rod of a tire-valve and move said valve to the open position when pump-pressure is applied.

2. A nipple connection and valve-opener comprising a shank, a connecting-sleeve swiveled thereon, a plunger having an enlarged head, an air-opening, and a face adapted to engage the rod of a tire-valve, for the purpose set forth, and a spring weaker than a tire-valve spring which normally holds the plunger forward but yields when the connecting-sleeve is screwed to a nipple and the face engages the rod of a tire-valve so that the plunger will be raised and the valve will not be opened until pump-pressure acts on the head of the plunger.

3. A nipple connection and valve-opener comprising a shank, a connecting-sleeve swiveled thereon, a plunger having an enlarged head, an air-opening and a face adapted to engage the end of a valve-rod and a packing-washer through which the plunger passes and which is engaged by the end of a nipple to make a tight joint.

4. A nipple connection and valve-opener comprising a shank, a connecting-sleeve swiveled thereon, a plunger having an enlarged head, an air-opening and a face adapted to engage the end of the valve-rod, a disk upon which the head of the plunger rests and which is provided with a sleeve through which the plunger extends, and a packing-washer through which the sleeve passes.

5. The combination with a nipple and a tire-valve having a rod, of a connection comprising a shank for the attachment of a flexible tube, a sleeve swiveled thereon and adapted to engage the nipple and a plunger having an enlarged head, an air-opening and a face adapted to engage the end of the valve-rod so that when pump-pressure is applied the plunger will force the valve to the open position.

6. The combination with a nipple, a tire-valve having a rod and a spring for retaining the valve in the closed position, of a connection comprising a shank for the attachment of a flexible tube, a sleeve swiveled thereon and adapted to engage the nipple, a plunger having an enlarged head, an air-opening and a face adapted to engage the end of the valve-rod and a spring weaker than the valve-spring which normally holds the plunger forward but yields when the connecting-sleeve is screwed to the nipple and the face engages the valve-rod, substantially as described, for the purpose specified.

In testimony whereof I affix my signature in presence of two witnesses.

WILLIAM S. STAPLEY.

Witnesses:
ANKER S. LYHNE,
ARTHUR H. MOORE.